Patented Jan. 23, 1951

2,539,178

UNITED STATES PATENT OFFICE 2,539,178

METALLIZED AZO DYESTUFF AND PROCESS OF PRODUCING THE SAME

Heinrich Hugo Bestehorn, Easton, Pa., assignor to General Aniline & Film Corporation, New York, N. Y., a corporation of Delaware No Drawing. Application November 6, 1947, Serial No. 784,507

7 Claims. (Cl. 260—148)

The present invention relates to new metallized azo dyestuffs and to a method for their production.

It is rather standard procedure in the dyestuff art to increase the fastness properties of azo dyestuffs by subjecting these dyestuffs to metallization, either in substance or on the fiber. It has always been the impression of the art that in order to effect this result, the azo dyes treated should have in o-position to and on opposite sides of the azo bridge, groups such as hydroxyl, amino, carboxy, and the like, capable of cooperating with the metallizing agents employed to effect the desired chelation. Inasmuch as the number of azo dyes having the desired groups on opposite sides of the azo bridge and in o-position thereto are comparatively few in number, the very advantageous metallizing process for increasing the fastness of the dyes has been fairly limited.

It has now been ascertained, quite contrary to the assumptions of the art, that azo dyes containing a hydroxyl group on one side of the azo bridge in o-position thereto but no groups ortho to the azo bridge on the opposite side thereof can be completely chelated by treating said azo dyes with a metallizing agent in an alkaline solution in the presence of an oxidizing agent, peroxidic in character. By this treatment an activation of the non-hydroxyl carrying side of the azo compound is brought about so that the condensed system of chelate rings forms over the azo bridge, strengthening the compound to the same extent as where the azo dyes utilized contain chelating groups in ortho position on both sides of the azo bridge. Thus, it has been discovered that the azo dyes metallized by the present method have the same fastness to light as that exhibited by azo dyes containing two chelating groups in ortho position to the azo bridge. Inasmuch as the criterion for complete chelation is the light fastness of the metallized dyes, the comparability of this property in the old dyes and those under consideration establishes a priori that the degree and extent of chelation involved in both instances is equivalent.

The azo dyes produced by the aforementioned method and the method of producing such dyes constitute the purposes and objects of the present invention.

The azo dyes, the metallization of which is contemplated herein, are obtained by coupling a diazotized amine of the benzene or naphthalene series free from substituents ortho to the azo group with a hydroxy bearing coupling component capable of coupling under alkaline conditions in ortho position to said hydroxyl group.

Examples of suitable primary amines for use in the preparation of the involved dyestuffs are:

m-Nitroaniline
p-Nitroaniline
N-acetyl-p-phenylenediamine
N-amino-o-cresol ethyl ether
p-Amino phenol
Sulfanilic acid
Aniline
p-Toluidine
m-Chloroaniline
m-Nitroaniline
β-Naphthylamine
2-naphthylamine-5-sulfonic acid
2-naphthylamine-6-sulfonic acid
Benzidine, and the like.

The coupling components are chiefly those of the class of phenols, naphthols and pyrazolones. Suitable coupling components are, for example:

β-Resorcylic acid
β-Naphthol
Naphthionic acid
1-naphthol-4-sulfonic acid
1-naphthol-4.7-disulfonic acid
1-naphthol-5-sulfonic acid
1-naphthol-3.6-disulfonic acid
H-acid
G-acid
Acetyl H-acid
Benzoyl H-acid
K-acid
β-Hydroxy naphthoic acid
Dichlorbenzoyl K acid
R-acid
Schaeffer's acid
2-naphthol-3.6.8-trisulfonic acid
The urea of 2-amino-5-naphthol-7-sulfonic acid
1-phenyl-3-methyl-5-pyrazolone
1-p-sulfophenyl-3-carboxy-5-pyrazolone, and the like.

The process is not only operative with monoazo dyes but also with poly-azo dyes, either bis-, tris- or tetra-azo dyes.

As illustrative of the mono-azo dye, capable of undergoing metallization by my method reference may be made to those derived from the following arylamines and coupling components:

| Arylamines | Coupling Components |
|---|---|
| m-nitro-aniline | β-resorcylic acid. |
| p-nitro-aniline | chromotropic acid. |
| N-acetyl-p-phenylenediamine | R-acid. |
| N-acetyl-p-phenylenediamine | acetyl H-acid. |
| β-naphthylamine | β-naphthol. |
| M-amino-o-cresol ethyl ether | R-acid. |
| 2-naphthylamine-5-sulfonic acid | 1-naphthol-4-sulfonic acid. |
| 2-naphthylamine-6-sulfonic acid | β-naphthol. |
| p-toluidine | 1-methyl-3-phenyl-5-pyrazolone. |
| aniline | 1-p-sulfo-phenyl-3-carboxy-5-pyrazolone. |
| β-naphthylamine | 1-naphthol-4,7-disulfonic acid. |

The following illustrate satisfactory poly-azo dyes:

| Arylamine | Coupling Component |
|---|---|
| 2 mols of sulfanilic acid | 1 mol of β-naphthol. |
| 2 mols of aniline | 1 mol of the urea from 2-amino-5-naphthol-7-sulfonic acid. |
| 2 mols m-acetamino-aniline | 1 mol of the urea from 2-amino-5-naphthol-7-sulfonic acid. |
| 1 mol of the disazo dye of the preceding example (after hydrolysis). | 2 mols of β-naphthol. |

For effecting metallization of the azo dyes, the dyes either in substance or on the fiber are heated with an alkaline solution of the metallizing agent, and the oxidizing agent. The metallizing agents are those usually employed, such as the salts of copper, nickel, cobalt, chromium, and the like. Preferably the sulfates of copper, nickel and cobalt are utilized, whereas with chromium, best results are obtained with the formate.

The oxidizing agents are, as stated, of peroxidic character. Suitable oxidizing agents are:

Hydrogen peroxide
Sodium perborate
Ammonium persulfate
Potassium perphosphate
Per-formic acid
Per-propionic acid
Per-butyric acid
Per-benzoic acid, and the like. It has been found that metallization proceeds most satisfactorily when the oxidizing agent is one of the aforesaid oxygen carrying fatty acids, and their use is therefore recommended.

The temperature to which the compositions are heated to effect metallization varies, but usually ranges from about 30 to about 100° C.

The following examples serve to illustrate the invention but it is to be understood that the invention is not restricted thereto.

*Example 1*

One-seventh of a gram-mol of the disazo dyestuff obtained by coupling 2 mols of diazotized aniline with 1 mol of the urea of 2-amino-5-naphthol-7-sulfonic acid in the presence of soda in the usual manner, is resludged in 2000 parts of water at 15° C. Seventy-eight ml. of per-formic acid (obtained from 57 ml. of 30% hydrogen peroxide, mixed with 21 ml. of 90% formic acid) are gradually added to the dye solution along with 40 to 50 grams of soda in solution to maintain the mixture continuously alkaline. The temperature is raised to 30° C. and 144 ml. of 25% copper sulfate solution ($CuSO_4 5H_2O$) are added. The color of the mixture changes from red to red-violet. After 2 hours no further deepening of shade occurs. The mixture is filtered and the paste dried in the usual manner. A dyestuff is obtained which dyes cotton a brownish Bordeaux. The light-fastness, as expressed in fadeometer hours, is 5 times as good as that of the original dye.

*Example 2*

The known dyestuff of the following constitution

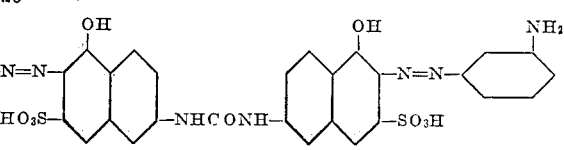

is dyed on cotton, diazotized on the fiber and developed with 2-naphthol, yielding on the fiber the red dyestuff:

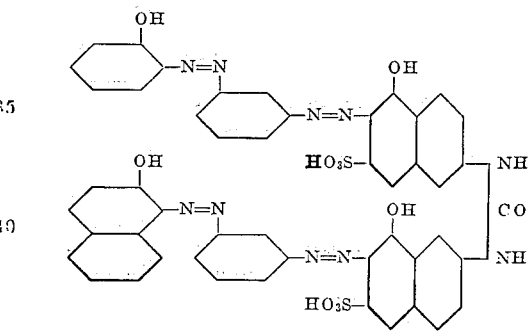

Into the developer bath, after complete developing, are added, for a 10-gram piece of cotton, 10 ml. of a 6% hydrogen peroxide solution and 5 ml. of a 40% copper sulfate solution ($CuSO_4 5H_2O$). After heating to 60–80° C. for about 20 minutes, the red color has changed to a deep, full blue. The new dyestuff, perfected on the fiber, has very good fastness to light and washing.

The literature has already mentioned the possibility of forming one-sided, chelate rings on azo dyes involving a single hydroxyl group. These compounds, however, are of no technical value for the reason that the strengthening of the azo bridge by a complete chelate ring extending over the azo bridge is not accomplished. As a consequence, such dyes have not found technical application since their light fastness is improved to a negligible extent, if at all, by such metallization. The procedure of the prior art in this respect is completely at odds with the present method wherein the azo bridge is strengthened by a complete chelate ring yielding dyes of the same light fastness as those obtained by the usual metallizing procedures involving a plurality of groups ortho to the azo bridge.

Various modifications of the invention will occur to operators in this field, and I therefore do not intend to be limited in the patent granted except as necessitated by the appended claims.

I claim:

1. The process of metallizing azo dyes which comprises heating an azo dye derived from a diazotized amine selected from the class consisting of those of the benzene and β-naphthalene series and free from substituent groups in the ortho positions to the azo group, and an hydroxylated cyclic coupling component which couples in alkaline solutions in ortho position to the hydroxyl group and selected from the class consisting of phenols, naphthols and pyrazolones, in an alkaline solution simultaneously with a metallizing salt and a peroxidic oxidizing agent.

2. The process as defined in claim 1 wherein the metallizing salt is copper sulfate.

3. The process as defined in claim 1 wherein the oxidizing agent is the per acid of a low molecular weight fatty acid.

4. The process as defined in claim 1 wherein the metallizing salt is copper sulfate and the oxidizing agent is performic acid.

5. The process of metallizing an azo dye derived from 2 mols of diazotized aniline and 1 mol of the urea of 2-amino-5-naphthol-7-sulfonic acid, which comprises heating the dyestuff to a temperature of 30° C. in an aqueous alkaline solution in the presence of copper sulfate and performic acid.

6. The dyestuff obtained according to the process of claim 1.

7. The dyestuff obtained according to the process of claim 5.

HEINRICH HUGO BESTEHORN.

REFERENCES CITED

The following references are of record in the file of this patent:

UNITED STATES PATENTS

| Number | Name | Date |
|---|---|---|
| 662,122 | Israel et al. | Nov. 20, 1900 |
| 2,045,090 | Lange et al. | June 23, 1936 |
| 2,124,881 | Lange et al. | July 26, 1938 |
| 2,150,772 | Lange et al. | Mar. 14, 1939 |
| 2,277,551 | Kirst et al. | Mar. 24, 1942 |
| 2,396,328 | Kvalnes et al. | Mar. 12, 1946 |

FOREIGN PATENTS

| Number | Country | Date |
|---|---|---|
| 287,149 | Germany | Sept. 11, 1915 |